United States Patent
Sjoo et al.

(10) Patent No.: US 9,498,827 B2
(45) Date of Patent: Nov. 22, 2016

(54) ARRANGEMENT FOR CONTROLLING THE PROCESS OF ROTARY CHIP REMOVING MACHINING OF A WORKPIECE, AND A CUTTING TOOL FOR ROTARY CHIP REMOVING MACHINING

(71) Applicants: Sture Sjoo, Gavle (SE); Peter Eriksson, Sandviken (SE); Martin Helgoson, Sr., Sandviken (SE)

(72) Inventors: Sture Sjoo, Gavle (SE); Peter Eriksson, Sandviken (SE); Martin Helgoson, Sr., Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 318 days.

(21) Appl. No.: 14/085,979

(22) Filed: Nov. 21, 2013

(65) Prior Publication Data
US 2014/0140781 A1    May 22, 2014

(30) Foreign Application Priority Data

Nov. 22, 2012 (EP) .................................... 12193804

(51) Int. Cl.
*B23Q 17/09* (2006.01)
*B23B 25/02* (2006.01)
(Continued)

(52) U.S. Cl.
CPC ............. *B23B 25/02* (2013.01); *B23F 21/146* (2013.01); *B23F 21/166* (2013.01);
(Continued)

(58) Field of Classification Search
CPC .. B23Q 15/007; B23Q 15/18; B23Q 16/005; B23Q 17/09; B23Q 17/0952; B23Q 17/0966; B23Q 17/098; B23Q 17/0985; B23Q 2717/006; G01M 13/00; Y10T 409/30728; Y10T 409/307224; Y10T 409/306888; Y10T 409/306832; Y10T 409/102226; Y10T 409/10159; Y10T 408/13; Y10T 408/14; Y10T 408/16; Y10T 408/165; Y10T 408/17; Y10T 408/172; Y10T 407/1715; Y10T 407/1725
IPC .............................. B23Q 15/007, 15/18, 17/09
See application file for complete search history.

(56) References Cited

U.S. PATENT DOCUMENTS

| | | | |
|---|---|---|---|
| 4,927,299 A | 5/1990 | Ramalingam | |
| 5,573,335 A * | 11/1996 | Schinazi | ............ B23Q 17/0985 374/141 |

(Continued)

FOREIGN PATENT DOCUMENTS

| DE | 19738229 A1 | 3/1999 |
|---|---|---|
| DE | 19950215 A1 | 6/2001 |

(Continued)

OTHER PUBLICATIONS

EPO Machine translation of DE 10227677, printed Feb. 2016.*

*Primary Examiner* — Daniel Howell
(74) *Attorney, Agent, or Firm* — Corinne R. Gorski

(57) ABSTRACT

An arrangement for controlling the process of rotary chip removing machining of a work piece includes a monitoring system for monitoring the rotary chip removing machining. The monitoring system has at least one surface acoustic wave sensor and at least one first antenna mounted to a cutting tool. At least one second antenna is arranged for wireless communication with the second antenna. Each sensor detects at least one parameter of a group of parameters consisting of strain, temperature and pressure. The sensor and the first antenna transmit the detected at least one parameter to the second antenna in response to an interrogation signal received by the first antenna. A processing unit is connected to the second antenna and transmits the interrogation signal and transmission energy to the first antenna and to the sensor via the second antenna. A control system communicates with the monitoring system to control the machining of the work piece at least partially based on the detected parameter. A cutting tool is provided with the at least one sensor and the at least one first antenna.

16 Claims, 9 Drawing Sheets

(51) Int. Cl.
*B23F 21/14* (2006.01)
*B23F 21/16* (2006.01)

(52) U.S. Cl.
CPC ..... *B23Q 17/0966* (2013.01); *B23Q 17/0985* (2013.01); *Y10T 407/1715* (2015.01); *Y10T 408/16* (2015.01); *Y10T 409/10159* (2015.01)

(56) References Cited

U.S. PATENT DOCUMENTS

| | | | | |
|---|---|---|---|---|
| 6,144,332 | A * | 11/2000 | Reindl | G06K 19/0675 340/10.1 |
| 6,297,747 | B1 | 10/2001 | Magori et al. | |
| 7,289,873 | B2 * | 10/2007 | Redecker | B23Q 1/0009 307/104 |
| 7,431,682 | B2 * | 10/2008 | Zeiler | B23B 49/006 483/9 |
| 7,710,287 | B2 * | 5/2010 | Lange | H02J 17/00 340/680 |
| 8,080,918 | B2 * | 12/2011 | Tzschentke | B23Q 1/34 310/321 |
| 2009/0234490 | A1 * | 9/2009 | Suprock | B23B 31/02 700/159 |

FOREIGN PATENT DOCUMENTS

| | | | |
|---|---|---|---|
| DE | 10227677 A1 | 2/2003 | |
| DE | 102005029053 A1 | 1/2007 | |
| DE | 102007036002 A1 | 2/2009 | |
| DE | 102009016257 A1 | 6/2010 | |
| EP | 1025952 A1 * | 8/2000 | ............ B23Q 11/00 |
| EP | 112810 A1 * | 7/2001 | |
| EP | 1762331 A1 | 3/2007 | |
| EP | 2050535 A1 * | 4/2009 | ............ B23B 29/04 |
| FR | 2922129 A1 * | 4/2009 | ............ B23B 29/04 |
| GB | 2438877 A * | 12/2007 | ......... A61B 17/1626 |
| GB | 2467185 A | 7/2010 | |
| JP | S6094258 A | 5/1985 | |
| JP | S61230845 A | 10/1986 | |
| WO | 9709596 A2 | 3/1997 | |
| WO | 2010111743 A1 | 10/2010 | |

* cited by examiner

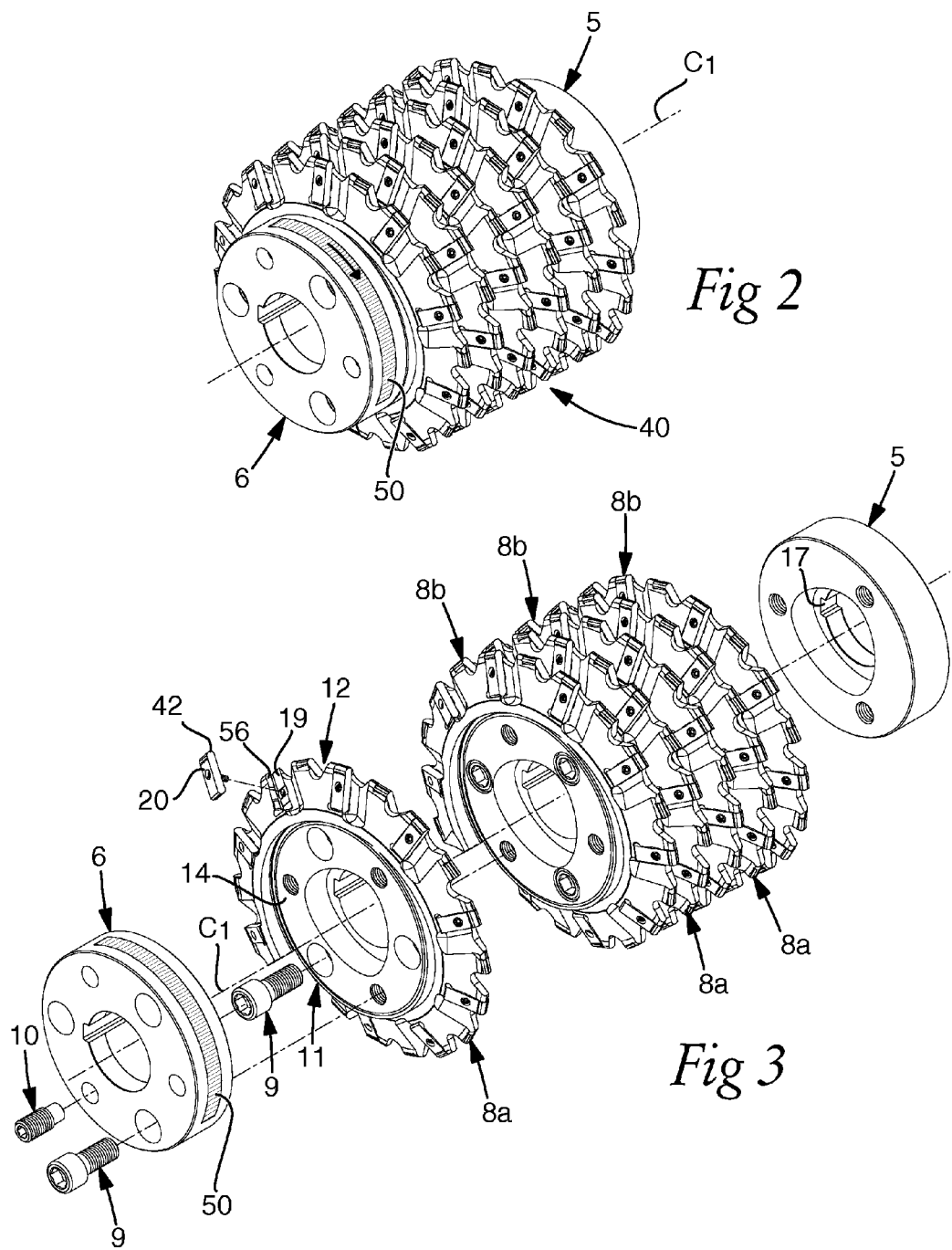

ARRANGEMENT FOR CONTROLLING THE PROCESS OF ROTARY CHIP REMOVING MACHINING OF A WORKPIECE, AND A CUTTING TOOL FOR ROTARY CHIP REMOVING MACHINING

RELATED APPLICATION DATA

This application claims priority under 35 U.S.C. §119 to EP Patent Application No. 12193804.7, filed on Nov. 22, 2012, which the entirety thereof is incorporated herein by reference.

TECHNICAL FIELD

The present invention relates to an arrangement for controlling the process of rotary chip removing machining of a work piece, for example a work piece of titanium, steel, aluminium, castings, or of any other material, wherein the arrangement comprises a monitoring system for monitoring the rotary chip removing machining. Further, the present invention relates to a cutting tool for chip removing machining of a work piece, for example of the sort stated above. The cutting tool comprises a tool body which is connectable to a holder or a rotatable spindle. The tool body defines a center axis and is provided with at least one cutting edge or at least one seat for receiving a cutting insert having at least one cutting edge.

BACKGROUND OF THE INVENTION

In general, a cutting tool for the rotary chip removing machining of a work piece, for example a work piece of titanium, steel, aluminium, castings, or of any other material, comprises a tool body provided with one or a plurality of cutting edges or cutting inserts each having at least one cutting edge. Each cutting insert is generally mounted in a seat, or a pocket, provided in the tool body. The tool body defines a center axis, or rotation axis, and is in general connectable to a holder or a rotatable spindle. When drilling, the tool body is in general rotated by rotation of the spindle or the holder, which holds the tool body, while the work piece is stationary. When milling, the tool body is in general rotated by rotation of the spindle or the holder, while the work piece is stationary or is fed in a direction of feed. When performing profile or contour milling, the tool body may, for example, be rotated in a direction of rotation about its rotation axis while the work piece is fed in relation to the tool body in a direction of feed. When turning, and also for some milling, in general, the work piece is rotated with the tool body is stationary and held by a holder. Often, a shim is provided between the cutting insert and the seat surface of the seat in order to protect the tool body if the stress on the cutting insert becomes too great. A shim is easily changed and a change of the entire tool body is thus avoided.

In prior art, different monitoring systems are suggested to monitor the rotary chip removing machining of a work piece.

U.S. Pat. No. 7,289,873 discloses a sensor system for a cutting machine tool comprising a sensor arrangement measuring a force and/or a torque and/or the body sound within the cutting machine tool, an energy supply unit, which inductively provides energy for the supply of the sensor arrangement of the cutting machine tool out of a magnetic alternating field, and a data transmitting unit, which wirelessly transmits data which relate to a value measured by the sensor arrangement.

U.S. Pat. No. 7,883,303 describes a machine tool spindle structure capable of monitoring a working state, which includes a spindle body, a rotating mandrel, a cutter base, and an internal inspecting device. The rotating mandrel has a chamber, and the internal inspecting device is disposed in the chamber. Inspecting chips in the internal inspecting device are directly disposed on the cutter base. Working parameters are transmitted to an external information device by a wireless transmission module in the internal inspecting device.

US 2008/0105094 discloses a machine tool control method employing a machine tool for carrying out a work producing process having a cutting implement for machining a work piece according to the process. A sensor device is provided on the cutting implement for sensing at least one condition of the process.

US 2009/0235763 describes a chuck-integrated force-measuring system for determining cutting forces at the cutting tool tip of a rotating tool, for example a drill or milling cutter having a sensor, as well as a measured-value processing station. The sensor is designed as a strain sensor which is placed on a tool holder of a machine tool.

WO 2009/117396 discloses a tool holder including a body, a processor disposed with the body, and a transceiver disposed with the body and in communication with the processor. The transceiver is structured to communicate with an external receiving device. A cutting assembly has a number of sensors, and the processor is structured to communicate with the sensors.

U.S. Pat. No. 7,710,287 describes a sensor system for a machine tool with a sensor with a measurement instrument, which measures a physical quantity occurring within the machine tool, with a first energy supply for supply of the measurement instrument of the sensor, wherein the first energy supply receives electric energy from a surrounding electromagnetic field in a wireless way, and with a battery for supplying the measurement instrument of the sensor.

U.S. Pat. No. 8,083,446 discloses a spindle for a machine tool for machining work pieces, wherein a data acquisition element for recording operating and/or state data of the spindle is provided, and wherein the data acquisition element is in the form of a radio chip and can be read by radio.

U.S. Pat. No. 8,080,918 describes an apparatus and a method for controlling the machining of work pieces using piezoceramic transducers.

US 2009/0175694 discloses a system including a cutting tool, which includes a tool body, and an integrated circuit chip securely mounted within the tool body and capable of being read and written upon.

U.S. Pat. No. 6,297,747 describes a tool holder having a sensor for measuring an operating parameter of the tool holder or the tool during the operation. The sensor is a surface acoustic wave sensor operating according to acoustic wave principles and its measured value signals are readable in a contactless manner by means of radio waves.

DE 10 2007 036 002 discloses a monitoring device for a processing tool, comprising an oscillation device and an oscillation detector which are connected in a sensor and form a surface wave sensor.

DE 10227677 describes a method for wireless monitoring of a machine part using a passive conducting cable structure. A passive sensor can be configured as a surface wave sensor.

SUMMARY OF THE INVENTION

The inventors of the present invention have identified the need for an efficient monitoring and control of the rotary chip removing machining of a work piece in order to improve the rotary chip removing machining of a work piece.

The object of the present invention is to improve the process of rotary chip removing machining of a work piece, for example a work piece of titanium, steel, aluminium, castings, or of any other material.

The above-mentioned object of the present invention is attained by providing an arrangement for controlling the process of rotary chip removing machining of a work piece, wherein the arrangement comprises a monitoring system for monitoring the rotary chip removing machining. The monitoring system comprises at least one surface acoustic wave sensor arranged to be mounted to a cutting tool for rotary chip removing machining of the work piece. The monitoring system comprises at least one first antenna arranged to be mounted to the cutting tool, the at least one first antenna being connectable to the at least one surface acoustic wave sensor. The monitoring system comprises at least one second antenna, the at least one first antenna being arranged for wireless communication with the at least one second antenna. Each surface acoustic wave sensor is arranged to detect at least one parameter of a group of parameters consisting of strain, temperature and pressure.

The at least one surface acoustic wave sensor and the at least one first antenna are arranged to transmit the detected at least one parameter to the second antenna in response to an interrogation signal received by the first antenna from the second antenna. The at least one surface acoustic wave sensor and the at least one first antenna are arranged to receive energy from the interrogation signal in order to transmit the detected at least one parameter to the second antenna. The monitoring system comprises a processing unit connected to the at least one second antenna. The processing unit is arranged to transmit the interrogation signal and transmission energy to the at least one first antenna and to the at least one surface acoustic wave sensor via the at least one second antenna.

The processing unit is arranged to receive the detected at least one parameter via the at least one second antenna. The arrangement comprises a control system arranged to communicate with the monitoring system, wherein the control system is arranged to control the rotary chip removing machining of the work piece at least partially based on the detected at least one parameter.

By means of the arrangement according to the present invention, the control of the rotary chip removing machining of the work piece is improved. A safe, predictable and efficient machining is provided by means of the arrangement according to the present invention, a feedback control of the rotary chip removing machining can be provided, e.g., the control system may be arranged to take action or control the machining by means of process data feedback. A safe, predictable and efficient closed loop machining process is provided by means of the arrangement which furthermore makes it possible to combine data from different parts, such as the cutting tool and the machine in which the cutting tool is arranged. This data is treated in the processing unit and/or a process monitoring unit by calculating or determining for instance a contact time and/or force on the cutting tool based on the sensor data, in combination with for instance the force, torque and power of the machine for the cutting tool. The treated data may thereafter be evaluated in the processing unit and/or a process monitoring unit by comparing it with threshold values, wherein a range of possible responses may be triggered by means of the control system and/or a control/action unit.

One response may be an alarm in combination with advice for manual adjustment. Another response may be semi-automatic or automatic adjustments of cutting data and/or other parameters related to the machine, such as shifting the cutting tool into a more favourable position in relation to the work piece. It is also possible by means of the arrangement to collect data from the cutting tool/machine and transmit it to a remote location of for instance a cutting tool/machine manufacturer in order to provide an operator or customer with the possibility of extended support and service of the cutting tool/machine. The manufacturer may also provide more advanced analysis and processing of the data due to expert knowledge and thereby provide improved monitoring/control of the machining operation. Examples of the control of the rotary chip removing machining of the work piece at least partially based on the detected at least one parameter are disclosed in the detailed description of embodiments.

The surface acoustic wave sensor requires no current supply circuit but instead draws transmission energy, which is required for transmission of the detected at least one parameter, or value signal, to the second antenna, from the interrogation signal, which may be transmitted by radio waves from the second antenna and is received by the surface acoustic wave sensor. The interrogation signal may be a high frequency interrogation signal. Thus, the tool body does not need to be provided with any bulky energy or power source, e.g. a battery or inductive energy supply means, which may experience malfunction, whereby reliable and durable monitoring and control systems are provided. A passive surface acoustic wave sensor per se, which can be wirelessly interrogated, is previously known and is e.g. disclosed in U.S. Pat. No. 6,144,332. A surface acoustic wave sensor can be small in size and thus, any bulky configuration is avoided. Consequently, by means of the present invention, a compact and flexible monitoring system for monitoring the rotary chip removing machining and a compact and flexible control system are provided, where the amount of cables and electrical conductors is reduced.

A surface acoustic wave sensor can be mounted to the cutting tool at a position in close proximity to that region of the cutting tool where the at least one parameter is most efficiently detected, providing more accurate values of the at least one parameter. By means of the more accurate values of the at least one parameter, the control system can more efficiently control the rotary chip removing machining. Further, by mounting the surface acoustic wave sensor on the cutting tool, the detected at least one parameter is associated with that specific cutting tool, whereby the detected at least one parameter of the specific cutting tool can be connected or related to other data of that specific cutting tool. By means of the non-bulky and compact structure of the at least one surface acoustic wave sensor and the at least one first antenna, the structure of the least one surface acoustic wave sensor and the at least one first antenna does not impair the performance of the cutting tool and thus does not impair the control of the rotary chip removing machining.

The at least one surface acoustic wave sensor and the at least one first antenna can be mounted to the cutting tool without any major reconstruction of the cutting tool and without any reconstruction of the spindle or holder holding the cutting tool and of the machine holding the spindle or holder, whereby the monitoring and control systems are easy to install in already-made rotary chip removing systems. By means of the arrangement according to the present invention, the communication between the parameter detection and the control system is reliable and efficient, whereby a reliable and accurate control of the chip removing machining is provided. Thus, by means of the arrangement according to the present invention an improved monitoring and control of the process of rotary chip removing machining of a work piece, for example a work piece of titanium, steel, aluminium, castings, or of any other material, is provided The cutting tool may comprise a tool body which is connectable to a holder or a rotatable spindle, the tool body defining a center axis and being provided with at least one cutting edge or at least one seat for receiving a cutting insert having at least one cutting edge. The control system may be arranged to control the rotary chip removing machining of the work piece based on the detected at least one parameter.

According to an advantageous embodiment of the arrangement according to the present invention, the arrangement comprises an identification system for identifying cutting tools, wherein the identification system comprises identification means arranged to be attached to the cutting tool, the identification means being arranged to provide at least identity data of the cutting tool, and wherein the monitoring system is arranged to communicate with the identification system. By means of this embodiment, the arrangement can relate data to a specific cutting tool in order to provide a safe, predictable and efficient machining, and the control system can more efficiently take action or control the machining by means of process data feedback. The at least one surface acoustic wave sensor may thus be related to a specific type of cutting tool. By means of this embodiment, the arrangement can efficiently monitor, analyse and control the rotary chip removing machining.

According to a further advantageous embodiment of the arrangement according to the present invention, the arrangement comprises at least one storage memory for storing data of the at least one cutting tool, wherein the identification system is arranged to communicate with the at least one storage memory. The arrangement may comprise at least one database including said at least one storage memory. Alternatively, or in addition, said identification means may comprise said at least one storage memory.

According to another advantageous embodiment of the arrangement according to the present invention, the arrangement comprises a machine arranged to machine the work piece by means of the cutting tool, the machine comprising a stand arranged to hold a holder or a rotatable spindle to which the cutting tool is connectable, wherein the control system is arranged to control said machine at least partially based on the detected at least one parameter.

According to yet another advantageous embodiment of the arrangement according to the present invention, the at least one second antenna is mounted to said stand. By means of this embodiment, an efficient mounting of the at least one second antenna in relation to the at least one first antenna is provided.

According to still another advantageous embodiment of the arrangement according to the present invention, the at least one second antenna is mounted to said stand such that no conductive material is blocking the wireless path between the at least one first antenna and the at least one second antenna. The machine itself, e.g. the stand, may e.g. exhibit interfering conductive parts or objects which could block the transmission between the first and second antennas. By means of this embodiment, an efficient and reliable wireless communication between the first and second antennas and thus an efficient and reliable transfer of the detected at least one parameter and the interrogation signal are ensured. The conductive material may be a metal, e.g. ferrous, material or object.

According to an advantageous embodiment of the arrangement according to the present invention, the at least one first and/or second antenna are/is made of one or a plurality of flexible materials. By means of these embodiments, the second antenna can be mounted to the stand in an efficient way and be given an efficient position to ensure an efficient wireless communication between the first and second antennas. By means of these embodiments, the first antenna can be mounted to the cutting tool in an efficient way and be given an efficient position to ensure an efficient wireless communication between the first and second antennas.

According to a further advantageous embodiment of the arrangement according to the present invention, the at least one second antenna comprises at least one microstrip antenna, e.g. a patch antenna. A microstrip antenna can be efficiently mounted to the stand and be given an efficient position to ensure an efficient wireless communication between the first and second antennas. However, the least one second antenna may comprise any other type of antenna.

The above-mentioned object of the present invention is attained by providing a cutting tool for rotary chip removing machining of a work piece. The cutting tool comprises a tool body which is connectable to a holder or a rotatable spindle. The tool body defines a center axis and is provided with at least one cutting edge or at least one seat for receiving a cutting insert having at least one cutting edge. The cutting tool is provided with at least one surface acoustic wave sensor and at least one first antenna connectable to the at least one surface acoustic wave sensor. The at least one first antenna is arranged for wireless communication with at least one second antenna. Each surface acoustic wave sensor is arranged to detect at least one parameter of a group of parameters consisting of strain, temperature and pressure. The at least one surface acoustic wave sensor and the at least one first antenna are arranged to transmit the detected at least one parameter to the second antenna in response to an interrogation signal received by the first antenna from the second antenna. The at least one surface acoustic wave sensor and the at least one first antenna are arranged to receive energy from the interrogation signal in order to transmit the detected at least one parameter to the second antenna.

By means of the cutting tool according to the present invention, the monitoring of the rotary chip removing machining of a work piece is improved, whereby an improved rotary chip removing machining of a work piece, for example a work piece of titanium, steel, aluminium, castings, or of any other material, is provided. As stated above, the surface acoustic wave sensor requires no current supply circuit but instead draws transmission energy from the interrogation signal. Thus, the tool body does not need to be provided with any bulky energy or power source, e.g. a battery.

The cutting tool may be a cutting tool for rotary chip removing machining of a work piece. The cutting tool may be a milling tool for milling a work piece, a turning tool for turning a work piece and/or a drill for drilling a work piece. A plurality of surface acoustic wave sensors may be connected, or connectable, to the same first antenna/-s, or each surface acoustic wave sensor may be connected, or connectable, to its own first antenna(s). The tool body may be provided with one or a plurality of seats, each seat receiving a cutting insert, which may be mounted to the seat. The cutting insert may be detachably mounted to the seat and may thus be exchangeable. Alternatively, the tool body may be provided with one or a plurality of cutting edges being integral with the tool body. The tool body may be provided with a plurality of circumferentially spaced apart cutting edges or seats.

According to an advantageous embodiment of the cutting tool according to the present invention, the tool body is provided with at least one surface acoustic wave sensor. By means of this embodiment, parameters related to the cutting edge or the cutting insert are efficiently detected. Alternatively, one or a plurality of shims, or one or a plurality of cutting inserts, mounted to the tool body may be provided with at least one surface acoustic wave sensor.

According to a further advantageous embodiment of the cutting tool according to the present invention, the at least one surface acoustic wave sensor is located adjacent to at least one cutting edge or at least one seat. By placing the least one surface acoustic wave sensor adjacent to at least one cutting edge or at least one seat, i.e. in the proximity of the cutting zone, parameters related to the cutting edge or the cutting insert can be efficiently detected. A cutting edge or a seat may be provided with at least two surface acoustic wave sensors. Alternatively, the at least one surface acoustic wave sensor, e.g. four surface acoustic wave sensors, may be attached to the shaft of the cutting tool or to one end portion of the cutting tool, in order to detect or determine parameters related to the deflection or bending of the cutting tool. Alternatively, at least one surface acoustic wave sensor may be located adjacent to a cooling fluid channel providing cooling fluid, e.g. cooling liquid, during the machining, e.g. close to the orifice of the cooling fluid channel, for detecting or determining parameters related to the cooling, e.g. the pressure of the cooling fluid.

According to another advantageous embodiment of the cutting tool according to the present invention, at least one seat is provided with at least one surface acoustic wave sensor. By mounting the at least one surface acoustic wave sensor to the seat, parameters related to the cutting insert can be efficiently detected or determined.

According to still another advantageous embodiment of the cutting tool according to the present invention, each seat comprises at least one seat surface, wherein the seat surface of at least one seat is provided with at least one surface acoustic wave sensor. By mounting the at least one surface acoustic wave sensor in the seat surface, parameters related to the cutting insert can be efficiently detected or determined.

According to yet another advantageous embodiment of the cutting tool according to the present invention, the cutting tool is arranged for the hobbing of a work piece, wherein the center axis of the tool body is a rotation axis, wherein the tool body comprises a plurality of segments, each segment comprising a plurality of circumferentially spaced apart cutting edges or seats, each seat being arranged to receive a cutting insert, and wherein each segment is provided with at least one surface acoustic wave sensor. Alternatively, cutting tool may be a milling tool arranged for other milling operations than hobbing, e.g. profile or contour milling etc. The cutting tool may also be a turning tool arranged for turning a work piece and/or a drill for drilling a work piece. By means of this embodiment, the hobbing of a work piece can be efficiently monitored.

According to an advantageous embodiment of the cutting tool according to the present invention, adjoining segments are detachably connectable to one another, wherein each segment is provided with at least one electrical connector connected to the at least one surface acoustic wave sensor of the same segment, and wherein each electrical connector is directly connectable to the first antenna or indirectly connectable to the first antenna via one or a plurality of intermediate electrical connectors of one or a plurality of intermediate segments. By providing said electrical connectors, each surface acoustic wave sensor is efficiently connected to the first antenna. A plurality of surface acoustic wave sensors may be connected to one and the same electrical connector, or one electrical connector may be provided for each surface acoustic wave sensor. Alternatively, the surface acoustic wave sensor may be directly connected to the first antenna without any electrical connector.

According to another advantageous embodiment of the cutting tool according to the present invention, the cutting tool comprises at least one tool member connectable to the holder or rotatable spindle, wherein the tool body is connectable to the holder or rotatable spindle via the least one tool member, wherein the tool member is provided with at least one electrical connector, wherein the tool body is provided with at least one electrical connector connected to the at least one surface acoustic wave sensor, and wherein each electrical connector is directly connectable to the first antenna or indirectly connectable to the first antenna via one or a plurality of intermediate electrical connectors. Each electrical connector may be detachably connectable to the first antenna and/or detachably connectable to another electrical connector. By means of these embodiments, the cutting tool is made modular and the modules are easy to assemble into a complete cutting tool. The at least one tool member may be provided with at least one cutting edge or at least one seat for receiving a cutting insert having at least one cutting edge, or the tool member may be a tool extender without any cutting edges and seats.

According to a further advantageous embodiment of the cutting tool according to the present invention, each segment defines a center axis and comprises a first side and a second side, the center axis of the segment extending through the first and second sides and being collinear with the center axis of the tool body, wherein at the first side each electrical connector of the segment is detachably connectable to the first antenna and/or to an electrical connector of an adjoining segment, and wherein at the second side each electrical connector of the segment is detachably connectable to the first antenna and/or to an electrical connector of an adjoining segment. By means of this embodiment, an efficient modular concept is provided for the hobbing tool having a plurality of detachable segments, whereby the surface acoustic wave sensors are easily and automatically connected to the at least one first antenna when the hobbing tool is assembled and when the segments are connected to one another.

According to another advantageous embodiment of the cutting tool according to the present invention, each segment comprises a peripheral cam provided with the plurality of circumferentially spaced apart cutting edges or seats, wherein the peripheral cam extends along a helical line, wherein in relation to the direction of rotation about the rotation axis one of the cutting edges or seats of the peripheral cam is a leading cutting edge or leading seat in relation to the other cutting edges or seats of the segment, and wherein at least the leading cutting edge or leading seat is provided with at least one adjacent surface acoustic wave sensor. The inventors of the present invention have found that the leading cutting edge or leading cutting insert is subjected to more stress in relation to the other cutting edges or cutting inserts of the same hob segments. By detecting or determining parameters at least related to the leading cutting edge or the leading cutting insert, an efficient monitoring of the hobbing of a work piece is provided.

According to yet another advantageous embodiment of the cutting tool according to the present invention, the cutting tool comprises two end members through which the center axis of the cutting tool extends, wherein the plurality of segments are located between said two end members, and wherein at least one of the two end members is provided with the at least one first antenna. This is an efficient location of the first antenna, which further improves the modular concept for the hobbing tool. The first antenna may be provided in a groove, e.g. a circumferential groove, provided in the end member. Alternatively, at least one of the segments may be provided with the at least one first antenna, and as surface acoustic wave sensor and the first antenna may form a unit.

According to still another advantageous embodiment of the cutting tool according to the present invention, each cutting edge or each seat is provided with at least one adjacent surface acoustic wave sensor. By detecting or determining parameters related to each cutting edge or each cutting insert, an efficient monitoring of the rotary chip removing machining of a work piece is provided.

According to a further advantageous embodiment of the cutting tool according to the present invention, the tool body is provided with the at least one first antenna.

According to another advantageous embodiment of the cutting tool according to the present invention, the tool body is rotatable about its center axis, and the at least one surface acoustic wave sensor and the at least one first antenna are movable in relation to the at least one second antenna.

According to an advantageous embodiment of the arrangement according to the present invention, the arrangement comprises at least one cutting tool as claimed in any of the claims 8 to 15 and/or at least one cutting tool according to any of the other disclosed embodiments. Positive technical effects of the embodiments of the arrangement according to the present invention may correspond to the technical effects mentioned in connection with the cutting tool according to the present invention, and its embodiments.

The at least one first surface acoustic wave sensor may be one or a plurality of surface acoustic wave sensors. The at least one first antenna may be one or a plurality of first antennas. The at least one second antenna may be one or a plurality of second antennas. The at least one storage memory may be one or a plurality of storage memories. The at least one parameter may be one or a plurality of parameters. The at least one cutting edge may be one or a plurality of cutting edges. The at least one seat may be one or a plurality of seats. The at least one electrical connector may be one or a plurality of electrical connectors.

The above-mentioned features and embodiments of the arrangement and the cutting tool, respectively, may be combined in various possible ways providing further advantageous embodiments.

Further advantageous embodiments of the arrangement and the cutting tool, respectively, according to the present invention and further advantages with the present invention emerge from the detailed description of embodiments.

BRIEF DESCRIPTION OF THE DRAWINGS

The present invention will now be described, for exemplary purposes, in more detail by way of embodiments and with reference to the enclosed drawings, in which:

FIG. 2 is a schematic perspective view of the cutting tool of FIG. 1 in an assembled state.

FIG. 3 is a schematic perspective exploded view of the cutting tool of FIG. 2.

DETAILED DESCRIPTION OF EMBODIMENTS

Figure 1:
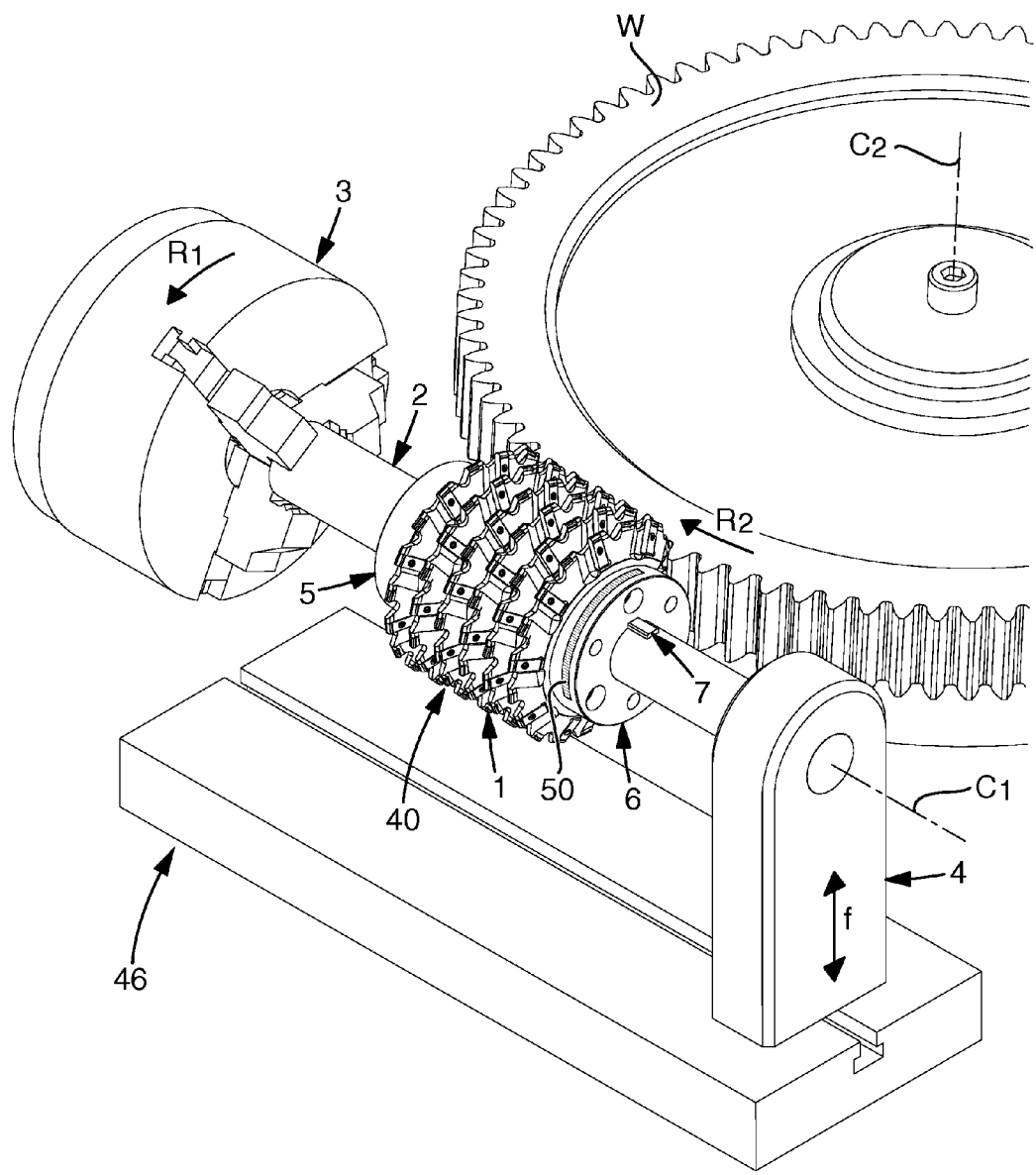
FIG. 1 is a schematic perspective view of an embodiment of the cutting tool according to the present invention.

FIG. 1 schematically shows an embodiment of the cutting tool 1 for rotary chip removing machining of a work piece W according to the present invention. The cutting tool 1 may be a milling tool, for example a milling tool 1 arranged for the hobbing of the work piece W, in order to form a cogwheel (for the sake of clarity, the cogs and the cut-out gashes are shown in a finish-machined state). The work piece W may for example be a work piece of titanium, steel, aluminium, castings, or of any other material. The cutting tool 1 shown in FIG. 1 may be called a hob, or a hobbing tool. The cutting tool 1 comprises a tool body 40 which is connectable to a holder, e.g. a rotatable shaft 2, or a rotatable spindle.

The tool body 40 defines a center axis C1, which may be defined as a rotation axis C1, and is provided with at least one cutting edge 42 or at least one seat 19 for receiving a cutting insert 20 having at least one cutting edge 42. In the embodiments of FIGS. 1-5, the tool body 40 is provided with at least one seat 19 for receiving a cutting insert 20 having at least one cutting edge 42. The cutting edge 42 and the cutting insert 20 may e.g. be made of cemented carbide, cermet, cubic boron nitride, polycrystalline diamond or ceramic. The material of the cutting edge 42 and the cutting insert 20 may be different from the material of the tool body 40. The tool body 40 may include the at least one cutting insert 20.

Alternatively, the tool body may be provided with one or a plurality of cutting edges being integral with the tool body. The tool body 40 may comprise a plurality of segments 8a, 8b. Each segment 8a, 8b may comprise a plurality of circumferentially spaced apart seats 19, each seat 19 being arranged to receive a cutting insert 20.

Alternatively, each segment may be provided with a plurality of circumferentially spaced apart cutting edges 42 which are integral with the respective segment 8a, 8b. Each cutting insert 20 may be detachably mounted to the seat 19 and may thus be exchangeable. Each segment 8a, 8b may be disc-shaped. According to the embodiment of FIG. 1, the cutting tool 1 may be mounted on a shaft 2 defining a center axis C1. One end of the shaft 2 may be clamped in a chuck 3, while the opposite end may be journalled in a bearing bracket 4.

Alternatively, a hobbing tool may be connected to a rotatable spindle at one end, whereas the other end is free. With reference to FIG. 3, two adjoining segments 8a, 8b may be detachably connectable to one another. The cutting tool 1, or tool body 40, may comprise two end members 5, 6 through which the center axis C1 of the cutting tool 1 extends, and the plurality of segments 8a, 8b may be located between said two end members 5, 6. The chuck 3 and thereby the cutting tool 1 may be rotatable in the direction R1 at the same time as the work piece W is turnable or rotatable in the direction R2, more precisely about a center axis C2. The chuck 3 and the bearing bracket 4 may be parts of a machine 44 arranged to machine the work piece by means of the cutting tool 1, and the machine 44 may comprise a stand 46 (see FIGS. 11-12).

In practice, the cutting tool 1 is driven at a considerably higher speed than the work piece W. For instance, the cutting tool 1 may be rotated 100 revolutions, while the work piece W may be turned one revolution. The feeding of the cutting tool 1 may be made parallel to the center axis C2, as outlined by means of the double arrow "f". By the selected directions of rotation R1, R2, the feeding takes place in the downward direction from an upper end position. The individual cutting inserts 20 included in the segments 8a, 8b may follow a continuous helical line along the outside of the tool body 40. In FIGS. 2 and 3, the nature of the cutting tool 1 is shown more in detail. In the example, the tool body 40 may comprise six segments 8a, 8b in total. However, the tool body 40 may comprise fewer of more segments 8a, 8b. Every second segment 8a, 8b of the shown set may be formed in a way that differs from the intermediate segments 8a, 8b. In order to separate the different segments, the segments 8a, 8b have been supplemented with the suffixes "a" and "b", respectively. Of the two end members 5, 6, the end members 5 farthest from the observer in FIGS. 2 and 3 may be designated as a "rear" end member, while the other may form a "front" end member 6. In the exploded view according to FIG. 3, there are further shown two types of screws, viz. a draw-in bolt 9 and a dismounting screw 10.

Figure 4:
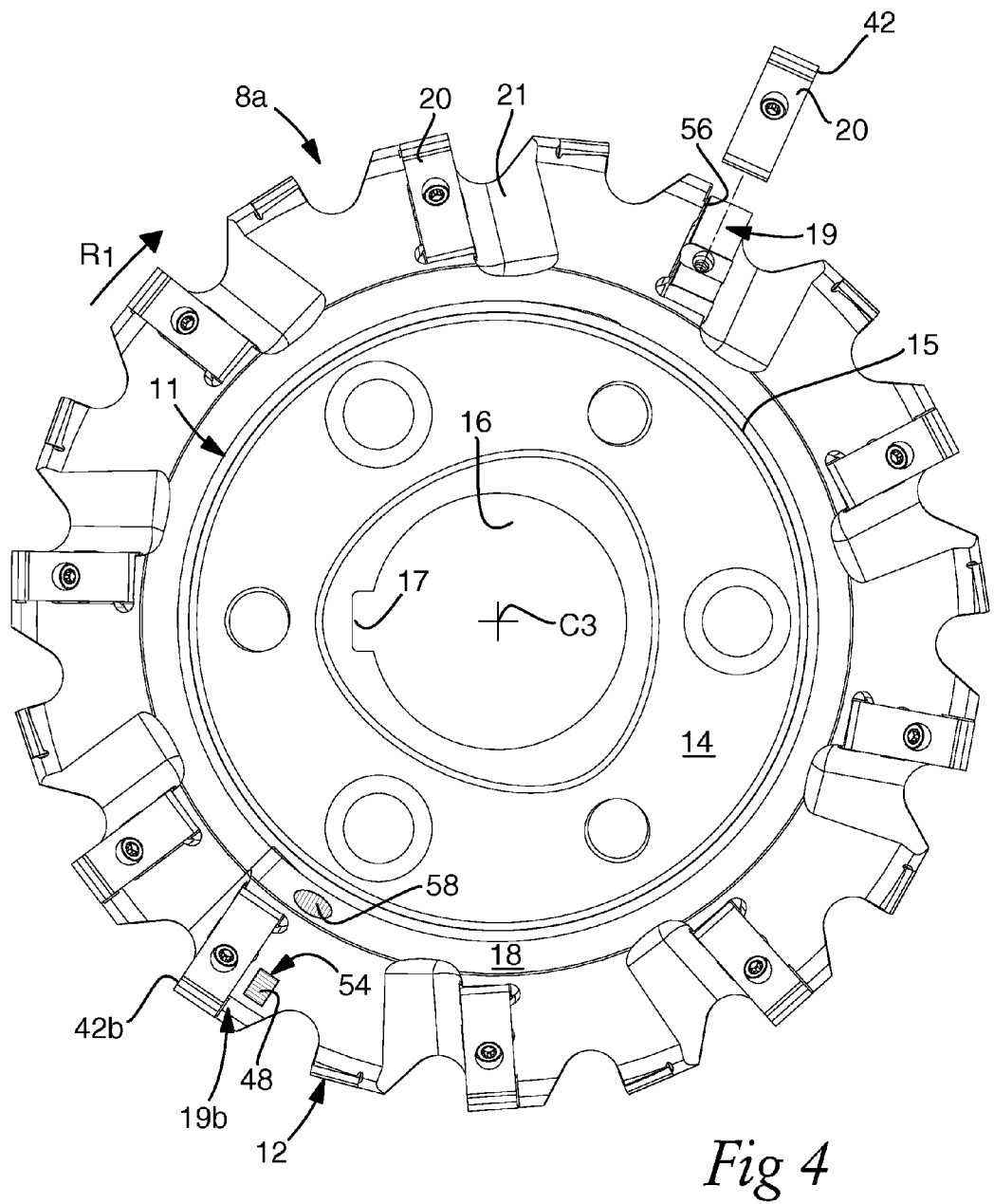
FIG. 4 is a schematic planar view of an embodiment of a segment of the cutting tool of FIGS. 1-3.
Figure 5:
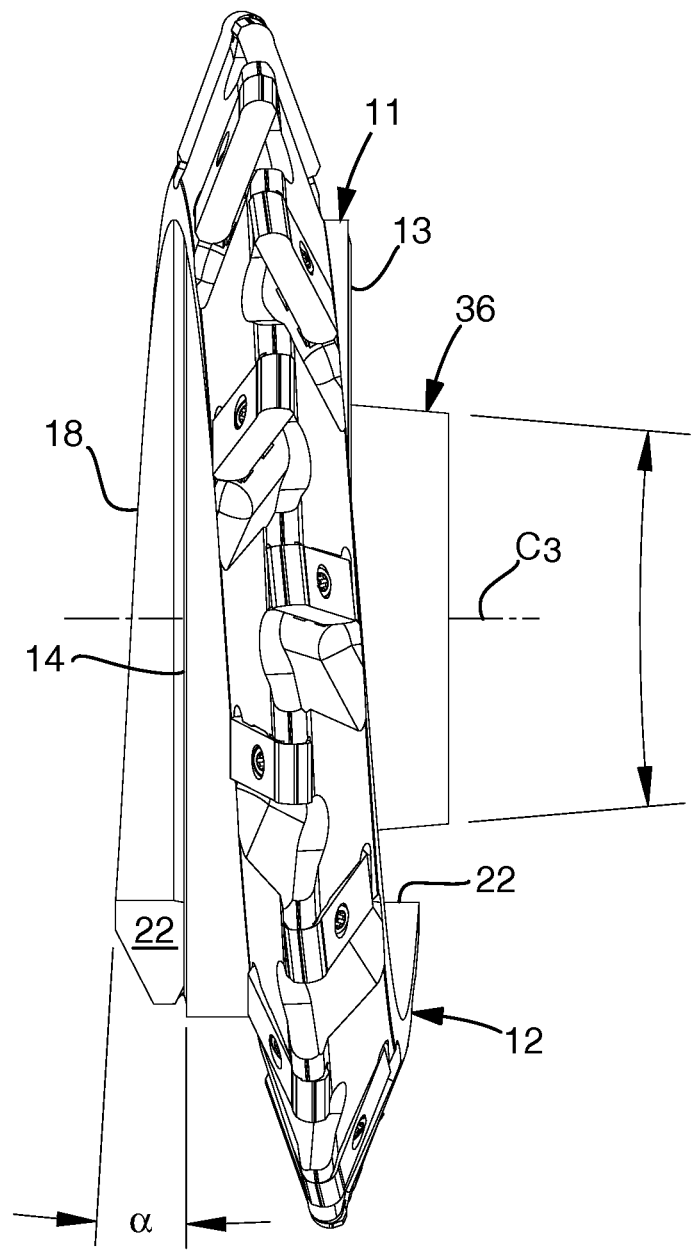
FIG. 5 is a schematic side view of the segment of FIG. 4.

In FIG. 4, there is shown an individual segment of the type that is designated 8a in FIG. 3. Each segment 8a, 8b may define a center axis C3 and may comprise a first side and a second side, the center axis C1 of the segment 8a, 8b extending through the first and second sides and being collinear with the center axis C1 of the tool body 1. Each segment 8a may include a hub part 11 and an outer peripheral cam 12 provided with the plurality of circumferentially spaced apart cutting edges 42 and/or seats 19. The hub part 11 may include two parallel end surfaces 13, 14, the first-mentioned one of which forms a rear end surface and the last-mentioned one a front end surface. Exteriorly, the hub part 11 may be limited by a partially cylindrical envelope surface 15, from which the cam 12 has a certain radial extension. The segments 8a, 8b may be mounted on a common drive shaft 2 (see FIG. 1), and the hub part 11 may include a central through opening 16 of a cylindrical shape. Adjacent to said central opening 16, a groove 17 is formed, in which a lock wedge 7 of the drive shaft 2 can engage. The two end surfaces 13, 14 may extend in planes, which are perpendicular to a center axis C3 that coincides with the center axis C1 of the tool body 40. In other words, the end surfaces 13, 14 may be mutually parallel. The envelope surface 15 may be concentric with the center axis C3.

The peripheral cam 12 may extend along a helical line. More precisely, the peripheral cam 12 may extend one turn along the hub part 11 and follow a helical line of a predetermined pitch. This pitch is indicated by the angle α between the plane end surface 13 of the hub part and a ring-shaped front surface 18 of the cam 12 (see FIG. 5). α may suitably be within the range of 1-10°. The cam 12 may be wedge-shaped in cross-section in such a way that it tapers from a wide base toward a pointed outer portion. Rotationally in front of each seat 19 and cutting insert 20, there is a chip channel 21 to facilitate the evacuation of the chips that are removed by means of the cutting inserts 20. Every second seat 19 and cutting insert 20, respectively, may be found in one flank surface of the cam 12 and every second in the other flank surface. It should also be mentioned that the cam 12 may end in plane surfaces 22 (see FIG. 5), which can be pressed against analogous surfaces of the cams 12 in adjacent segments 8a, 8b. Together, the cams 12 of the individual segments 8a, 8b thus form a continuous, thread-like screw formation of the assembled cutting tool 1. In relation to the direction of rotation about the rotation axis C1, C3 one of the cutting edges 42 or seats 19 of the peripheral cam 12 is a leading cutting edge 42b or leading seat 19b in relation to the other cutting edges 42 or seats 19 of the segment 8a, 8b.

Figure 6:
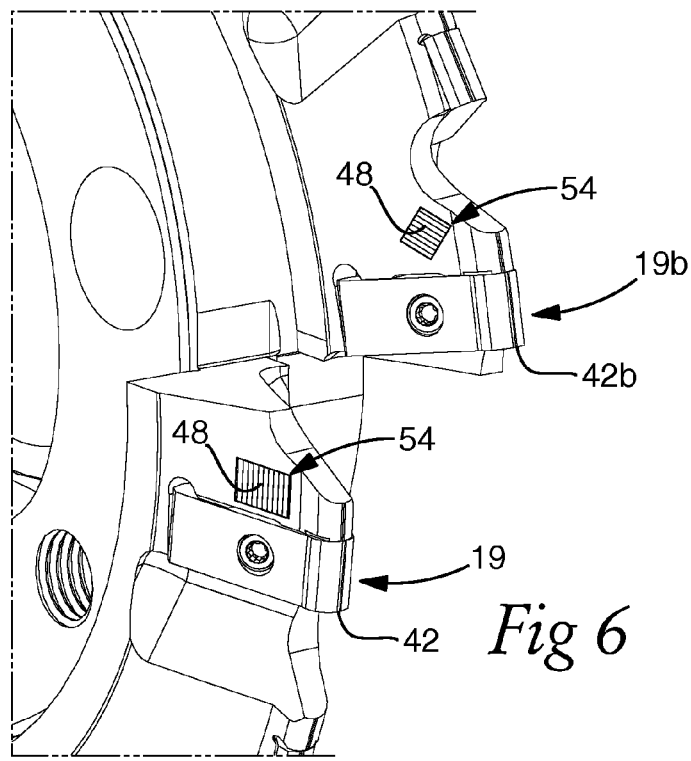
FIG. 6 is a schematic enlarged perspective view of a portion of the segment of FIG. 4.
Figure 7:
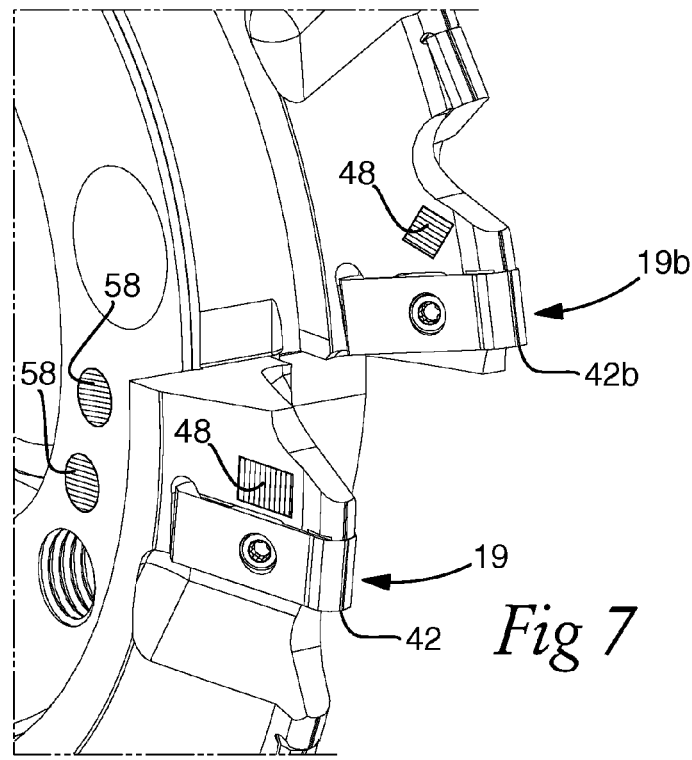
FIG. 7 is a schematic enlarged perspective view of a portion of another embodiment of a segment essentially corresponding to the segment of FIG. 4.

With reference to FIGS. 6 and 7, the cutting tool 1 is provided with at least one surface acoustic wave (SAW) sensor 48 (hereinafter called SAW sensor) and at least one first antenna 50 connectable to the at least one SAW sensor 48. The at least one first antenna 50 is arranged for wireless communication with at least one second antenna 52 (see FIGS. 10-12), e.g. via radio waves. Each SAW sensor 48 is arranged to detect, or sense, at least one parameter of a group of parameters consisting of strain, temperature and pressure. Further parameters may be determined at least partially based on the detected at least one parameter, i.e. based on the detected strain, temperature and/or pressure. Stress, impact, force and/or growth of wear in real time on the cutting tool 1, on the cutting insert and/or on the cutting edge 42 may be determined by means of the SAW sensor 48 and based on the detected at least one parameter. A SAW sensor 48 operates according to the principle of an acoustic surface wave device. A SAW sensor per se, which can be wirelessly interrogated, is previously known and is e.g. disclosed in U.S. Pat. No. 6,144,332. Each SAW sensor 48 may be located in a recess 54 in the tool body 40 and may be attached to the tool body 48 in said recess 54. With reference to FIGS. 6 and 7, two SAW sensors 48 may be placed in the same recess 54, where the outer SAW sensor 48 may be arranged to detect temperature. The at least one SAW sensor 48 and the at least one first antenna 50 are arranged to transmit the detected at least one parameter to the second antenna 52 in response to an interrogation signal received by the first antenna 50 from the second antenna 52. The at least one SAW sensor 48 and the at least one first antenna 50 are arranged to receive energy, or power, from the interrogation signal in order to transmit the detected at least one parameter to the second antenna 52. Thus, energy, or power, required for the transmission of the at least one detected parameter is received from the interrogation signal. The tool body 40 may be provided with at least one SAW sensor 48. Thus, at least one SAW sensor 48 may be attached to the tool body 40. The at least one SAW sensor 48 may be located adjacent to at least one cutting edge 42 or adjacent to at least one seat 19.

At least one seat 19 may be provided with at least one SAW sensor 48. Each segment 8a, 8b may be provided with at least one SAW sensor 48. Thus, at least one SAW sensor 48 may be attached to each segment. With reference to FIG. 6, at least the leading cutting edge 42b and/or leading seat 19b may be provided with at least one adjacent SAW sensor 48.

With reference to FIGS. 3 and 4, each seat 19 may comprise at least one seat surface 56, and the seat surface 56 of at least one seat 19 may be provided with at least one SAW sensor. Each cutting edge 42 or each seat 19 may be provided with at least one adjacent SAW sensor 48.

Figure 12:
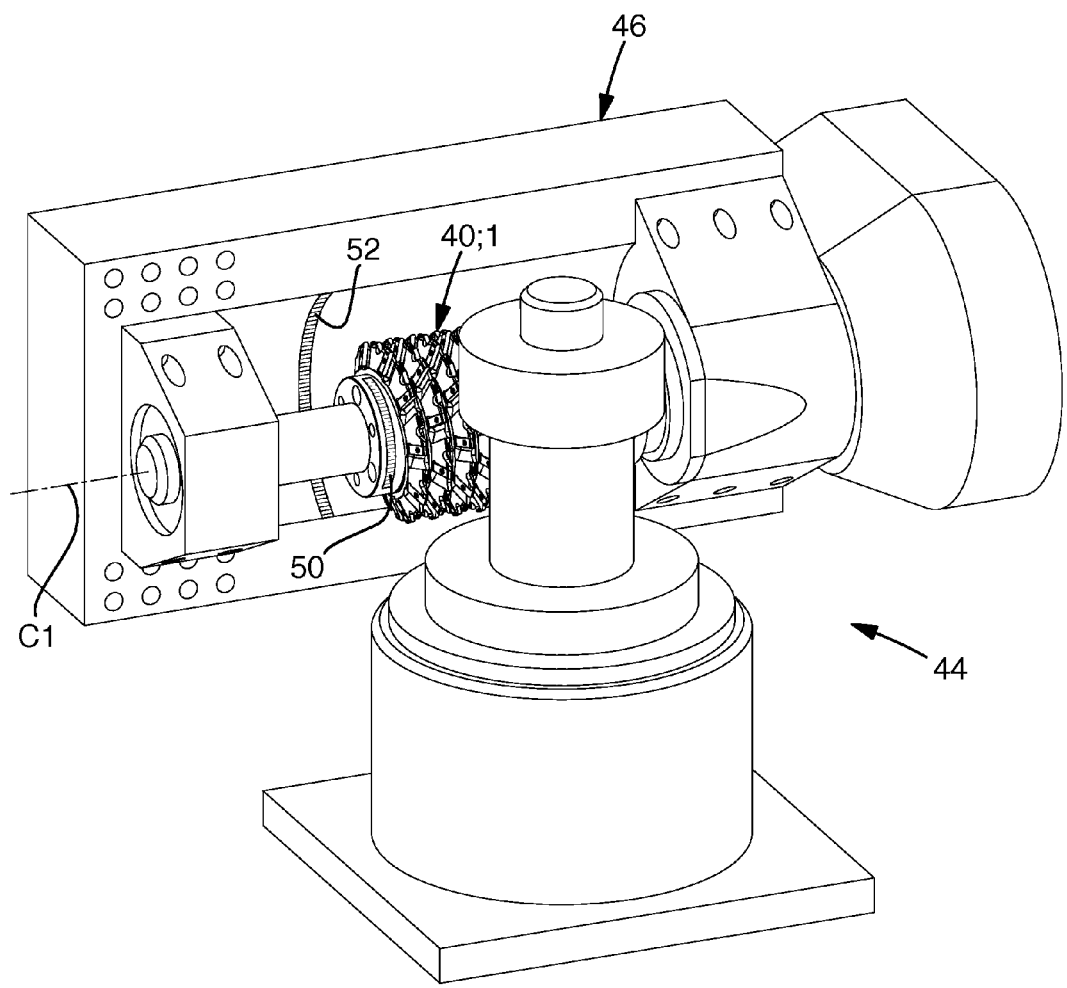
FIG. 12 is a schematic perspective cutaway view of an embodiment of the machine arranged to machine the work piece by means of the cutting tool of FIG. 2, the machine being included in an embodiment of the arrangement according to the present invention.

With reference to FIG. 3, at least one of the two end members 5, 6 may be provided with the at least one first antenna 50. Thus, the at least one first antenna 50 may be mounted to one or both of the two end members 5, 6. The first antenna 50 may have a circumferential extension at least partly about the center axis C1, or the first antenna 50 may form a substantially annular extension about the center axis C1. The first antenna 50 may be provided in a circumferential groove in the end member 5, 6. The first antenna 50 may be a dipole antenna. The first antenna 50 may be a slot antenna. The first antenna 50 may be an asymmetric slot dipole antenna. With reference to FIG. 12, when the tool body 40 is rotatable about its center axis C3, the at least one SAW sensor 48 and the at least one first antenna 50 may be movable in relation to the at least one second antenna 52. Each of the end members 5, 6 may be provided with a first antenna 50. The tool body 40 may be provided with the at least one first antenna 50. Thus, the at least one first antenna 50 may be mounted or attached to the tool body 40.

With reference to FIG. 7, each segment 8a, 8b may be provided with at least one electrical connector 58 connected to the at least one SAW sensor 48 of the same segment 8a, 8b. The electrical connector 58 may be connected to the at least one SAW sensor 48 by means of a cable, a communication line, or an electrical conductor etc., which may be provided in a groove, a recess and/or a bore, or in combinations thereof, provided in the tool body 40. Each electrical connector 58 is directly connectable to the first antenna 50 or indirectly connectable to the first antenna 50 via one or a plurality of intermediate electrical connectors 58 of one or a plurality of intermediate segments 8a, 8b.

At the first side of the segment 8a, 8b, each electrical connector 58 of the segment 8a, 8b may be detachably connectable to the first antenna 50 and/or to an electrical connector 58 of an adjoining segment 8a, 8b. At the second side of the segment 8a, 8b each electrical connector 58 of the segment 8a, 8b may be detachably connectable to the first antenna 50 and/or to an electrical connector 58 of an adjoining segment 8a, 8b. Hereby, a modular concept for the cutting tool 1 and its SAW sensors 48 and its at least one antenna 50 is provided. The segments 8a, 8b may be configured such that two segments 8a, 8b may be connected to one another in only one way and according to only one specific mutual relationship, whereby electrical connectors 58 of different segments 8a, 8b every time can be positioned along a common longitudinal axis when the segments 8a, 8b are assembled, e.g. by way of COROMANTCAPTO™ connection and by way of the above-mentioned groove 17.

Figure 8:
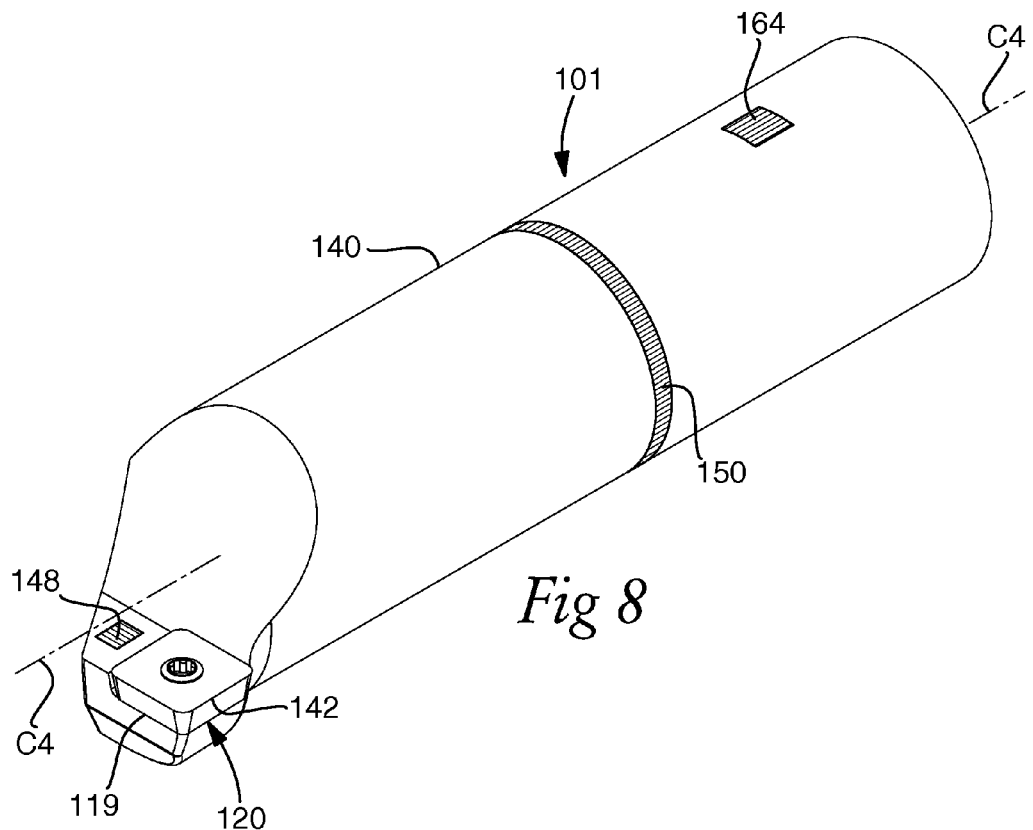
FIG. 8 is a perspective view of another embodiment of the cutting tool according to the present invention.

FIG. 8 schematically shows another embodiment of the cutting tool 101 for rotary chip removing machining of a work piece according to the present invention. The cutting tool 101 shown in FIG. 8 is a turning tool for turning a work piece, which may be rotated. The cutting tool 101 comprises a tool body 140 which is connectable to a holder. The tool body 140 defines a center axis C4 and is provided with at least one cutting edge 142 or at least one seat 119 for receiving a cutting insert 120 having at least one cutting edge 142. In the embodiment of FIG. 8, the tool body 140 is provided with at least one seat 119 for receiving a cutting insert 120 having at least one cutting edge 142. The cutting insert 120 may be made of cemented carbide, cermet, cubic boron nitride, polycrystalline diamond or ceramic. The cutting tool 101 is provided with at least one SAW sensor 148 and at least one first antenna 150 connectable, or connected, to the at least one SAW sensor 148. The at least one SAW sensor 148 may be connected to the at least one first antenna 150 by means of a cable, a communication line, or an electrical conductor etc., which may be provided in a groove, a recess and/or a bore (not shown), or in combinations thereof, provided in the tool body 140. The at least one first antenna 150 is arranged for wireless communication with at least one second antenna 52 (see FIG. 11), e.g. via radio waves. Each SAW 148 sensor may correspond to the SAW sensor 48 disclosed above. The at least one first antenna 150 may essentially correspond to the least one first antenna 50 disclosed above.

Figure 9:
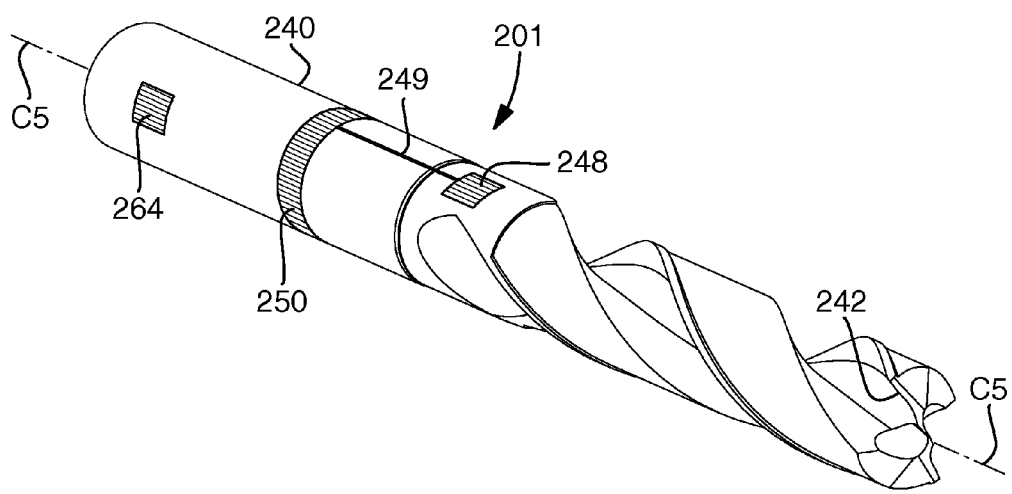
FIG. 9 is a perspective view of a further embodiment of the cutting tool according to the present invention.

FIG. 9 schematically shows a further embodiment of the cutting tool 201 for rotary chip removing machining of a work piece according to the present invention. The cutting tool 201 shown in FIG. 9 is a drill for drilling a work piece. The cutting tool 201 comprises a tool body 240 which may be connectable to a rotatable spindle. The tool body 240 defines a center axis C5. In the embodiment of FIG. 9, the tool body 240 is provided with at least one cutting edge 242 which is integral with the tool body 240. The cutting tool 201 is provided with at least one SAW sensor 248 and at least one first antenna 250 connectable, or connected, to the at least one SAW sensor 248. The at least one SAW sensor 248 may be connected to the at least one first antenna 250 by means of a cable 249, a communication line, or an electrical conductor etc., which may be provided in a groove, a recess and/or a bore (not shown), or in combinations thereof, provided in the tool body 240. The at least one first antenna 250 is arranged for wireless communication with at least one second antenna 52 (see FIG. 11), e.g. via radio waves. Each SAW 248 sensor may correspond to the SAW sensor 48 disclosed above. The at least one first antenna 250 may essentially correspond to the least one first antenna 50 disclosed above. The torque of the cutting tool 201 may be determined by means of the at least one SAW sensor 248, e.g. a plurality of SAW sensors, and at least partially based on the detected at least one parameter.

Figure 10:
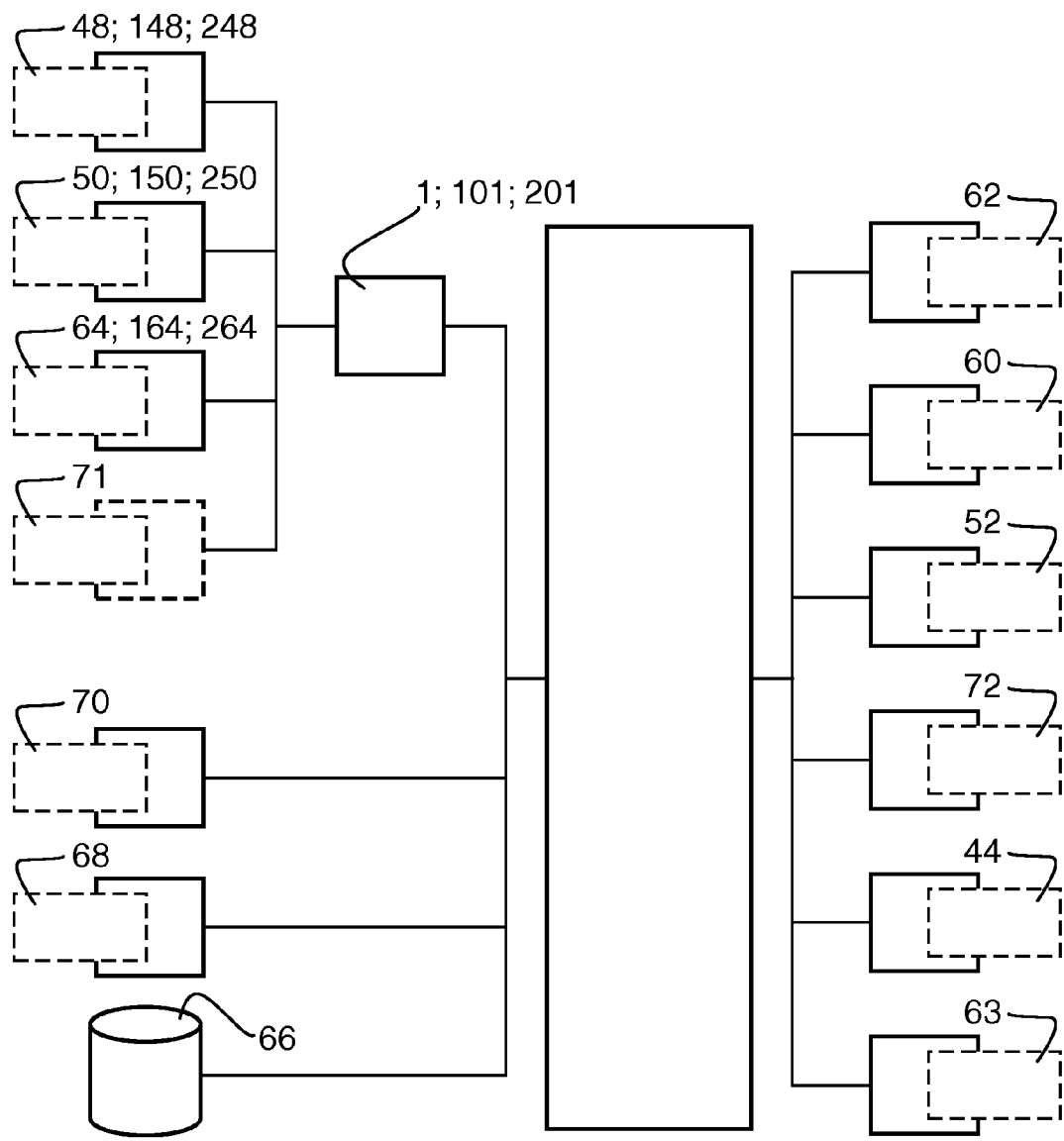
FIG. 10 is a schematic diagram illustrating aspects of an embodiment of the arrangement according to the present invention.

With reference to FIG. 10, aspects of an embodiment of the arrangement for controlling the process of rotary chip removing machining of a work piece W, according to the present invention are schematically illustrated. The arrangement comprises a monitoring system for monitoring the rotary chip removing machining. The monitoring system comprises at least one SAW sensor 48; 148; 248 arranged to be mounted to a cutting tool 1; 101; 201 for rotary chip removing machining of the work piece W. The SAW sensor 48; 148; 248 may be configured as disclosed above. The cutting tool 1; 101; 201 may be a cutting tool 1; 101, 201 according to any of the above-mentioned cutting tools 1; 101; 201, or any other cutting tool for rotary chip removing machining of a work piece. The cutting tool may at least comprise a tool body 40; 140; 240 which is connectable to a holder or a rotatable spindle, the tool body 40; 140; 240 defining a center axis C1; C4; C5 and being provided with at least one cutting edge 42; 142; 242 or at least one seat 19; 119 for receiving a cutting insert 20; 120 having at least one cutting edge 42; 142; 242. The monitoring system comprises at least one first antenna 50; 150; 250 arranged to be mounted to the cutting tool 1; 101; 201, e.g. as disclosed above. The at least one first antenna 50; 150; 250 is connectable, or connected, to the at least one SAW sensor 48; 148; 248, e.g. as disclosed above. The at least one SAW sensor 48; 148; 248 may be mounted to the tool 1; 101; 201 by way of means of attachment, e.g. an adhesive, snap means, or a slot or pocket into which the SAW sensor is inserted. The at least one first antenna 50; 150; 250 may be mounted to the tool 1; 101; 201 by way of means of attachment, e.g. an adhesive, snap means, a slot or pocket into which the first antenna is inserted, and/or other suitable attachment members. Other means of attachment are possible.

The monitoring system comprises at least one second antenna 52, and the at least one second antenna 52 is arranged for wireless communication with the at least one first antenna 50; 150; 250. Thus, the at least one first antenna 50; 150; 250 is also arranged for wireless communication with the at least one second antenna 52. The at least one SAW sensor 48; 148; 248 and the at least one first antenna 50; 150; 250 are arranged to transmit the detected at least one parameter to the second antenna 52 in response to an interrogation signal received by the first antenna 50; 150; 250 from the second antenna 52. As disclosed above, the at least one SAW sensor 48; 148; 248 and the at least one first antenna 50; 150; 250 are arranged to receive energy from the interrogation signal in order to transmit the detected at least one parameter to the second antenna 52. The monitoring system further comprises a processing unit 60 connected to the at least one second antenna 52. The processing unit 60 is arranged to transmit the interrogation signal and transmission energy to the at least one first antenna 50; 150; 250 and to the at least one SAW sensor 48; 148; 248 via the at least one second antenna 52. The processing unit 60 is arranged to receive the detected at least one parameter via the at least one second antenna 52. The arrangement comprises a control system 62 arranged to communicate with the monitoring system. The control system 62 may be arranged to communicate with the processing unit 60. The control system 62 may comprise a Computer Numerical Control (CNC). The control system 62 is arranged to control the rotary chip removing machining of the work piece W at least partially based on the detected at least one parameter, i.e. the at least one parameter detected by the at least one SAW sensor 48; 148; 248. The monitoring system, e.g. the processing unit 60 or the process monitoring unit 72, or the control system 62 may be arranged to determine at least one parameter, e.g. growth of tool wear in real time etc., as mentioned above, at least partially based on the detected at least one parameter.

The control system 62 may be arranged to control the rotary chip removing machining of the work piece W by controlling, such as increasing or decreasing, the rotary speed of the tool body 40; 140; 240 and/or of the work piece W at least partially based on the detected at least one parameter. The control system 62 may be arranged to control the rotary chip removing machining of the work piece W by controlling, such as increasing or decreasing, the rotary speed of the tool body 40 and by controlling the movement of the work piece W in relation to the tool body 40 in a direction of feed at least partially based on the detected at least one parameter. For a milling tool 1 arranged for hobbing, the control system 62 may be arranged to control the rotary chip removing machining of the work piece W by controlling, such as increasing or decreasing, the rotary speed of the tool body 40 and/or of the work piece and/or by controlling the linear movement of the tool body 40 in the direction of its center axis C1 at least partially based on the detected at least one parameter. As stated above, the detected at least one parameter may be any parameter of a group of parameters consisting of strain, temperature and pressure. Stress, impact, force and growth of wear in the cutting tool 1; 101; 201, on the cutting insert 20; 120 and/or on the cutting edge 42; 142; 242 and the torque of the cutting tool 1; 201 may be determined at least partially based on the detected at least one parameter, i.e. based on the strain, temperature and/or pressure detected by the at least one SAW sensor 48; 148; 248. By the control of the linear movement of the tool body 40 of a hobbing tool 1, the hob in cut may be shifted in position to achieve increased and optimized tool usage. The control system 62 may be configured for feedback control of the rotary chip removing machining. The control system 62 may be arranged to set a desired value or a desired interval for at least one parameter detected by means of the at least one SAW sensor 48; 148; 248, or for at least one parameter determined based on the detected at least one parameter. The monitoring system is arranged to detect the at least one parameter, and the control system 62 may be arranged to adjust the control of the rotary chip removing machining such that the detected at least one parameter, or the determined at least one parameter, is below or above said desired value, or such that the detected or determined at least one parameter is below, above or within said desired interval. The control system 62 may comprise a process control/action unit 63, which may perform adjustments of the control of the rotary chip removing machining. The process control/action unit 63 may be arranged to take action, control or adjust control of the machining at least partially based on the detected at least one parameter received from the at least one SAW sensor 48; 148; 248 and at least partially based on data from a cutting tool data module 68 (the cutting tool data module 68 is disclosed in more detail below). The process control/action unit 63 may, for example, be arranged to change cutting data, the position of the cutting tool 1; 101; 201 and/or the rotary speed of the tool body and/or the work piece at least partially based on the detected at least one parameter. The process control/action unit 63 may be included in the monitoring system. The process control/action unit 63 may be included in the processing unit 60. The process control/action unit 63 may be integrated in the control system 62, e.g. in the CNC. The process control/action unit 63 may be integrated in the cutting tool 1; 101; 201 and connected/connectable to the at least one SAW sensor 48; 148; 248 and the at least one first antenna 50; 150; 250. The process control/action unit 63 may be a stand-alone module or may be a remote function, e.g. via an Internet-based cloud service or any other service.

The monitoring system may further comprise a process monitoring unit 72. The process monitoring unit 72 may be arranged to communicate with the processing unit 60. The process monitoring unit 72 may comprise a software module. The arrangement may comprise an identification system for identifying cutting tools 1; 101; 201. The identification system comprises identification means 64; 164; 264 (see also FIGS. 8 and 9) arranged to be attached to the cutting tool 1; 101; 201. The identification means 64; 164; 264 is arranged to provide at least identity data of the cutting tool 1; 101; 201. The monitoring system is arranged to communicate with the identification system. The control system 62 may be arranged to communicate with the identification system. The arrangement may comprise at least one storage memory 66 for storing data of the at least one cutting tool 1; 101; 201. The identification system may be arranged to communicate with the at least one storage memory 66. The at least one storage memory 66 may be in the form of at least one database. The arrangement may comprise a machine 44 arranged to machine the work piece W by means of the cutting tool 1; 101; 201. The machine may comprise a stand 46 arranged to hold the holder or the rotatable spindle to which the cutting tool 1; 101; 201 is connectable. The control system 62 may be arranged to control said machine 44 at least partially based on the detected at least one parameter. The arrangement may comprise a cutting tool data module 68, which may be connected to the at least one storage memory 66 or may comprise the at least one storage memory 66. The cutting tool data module 68 and/or the at least one storage memory 66 may be arranged to store data of each cutting tool 1; 101; 201, e.g. desired values or reference values of the cutting tool. The data of the at least one cutting tool 1; 101; 201 may be limit values for monitoring purpose, nominal/actual dimensional data (e.g. diameter and length of the cutting tool), other cutting tool related data such as usable length and module size e.g. as for gear hobbing tools, recommended and actual cutting data (e.g. speed, feed, depth of cut), tool identification, tool life, and process related data e.g., time in use, data from SAW sensors 48 and from the other sensors. The cutting tool data module 68 and/or the at least one storage memory 66 may also be arranged to store limit values for monitoring purposes. The arrangement may comprise a cutting tool presetting unit 70 arranged to provide actual dimensions of the specific cutting tool 1; 101; 201 (actual values of the cutting tool). The actual dimensions of the specific cutting tool may be obtained from measurements on the specific cutting tool 1; 101; 201. The actual dimensions related to a specific cutting tool 1; 101; 201 can be loaded from the cutting tool pre-setting unit 70 to the cutting tool data module 68 and/or to the identification means 64. The cutting tool data module 68 and/or the at least one storage memory 66 may also be arranged to store machining process data from the machine 44, monitoring data from monitoring/analysis modules, action/control data to adjust/control the machining etc.

In addition to the at least one SAW sensor 48; 148; 248, the arrangement may comprise at least one additional sensor 71 arranged to be mounted to the cutting tool 1; 101; 201 or to the stand 46 or any other part of the machine 44. The arrangement may comprise the at least one cutting tool 1; 101; 201.

Figure 11:
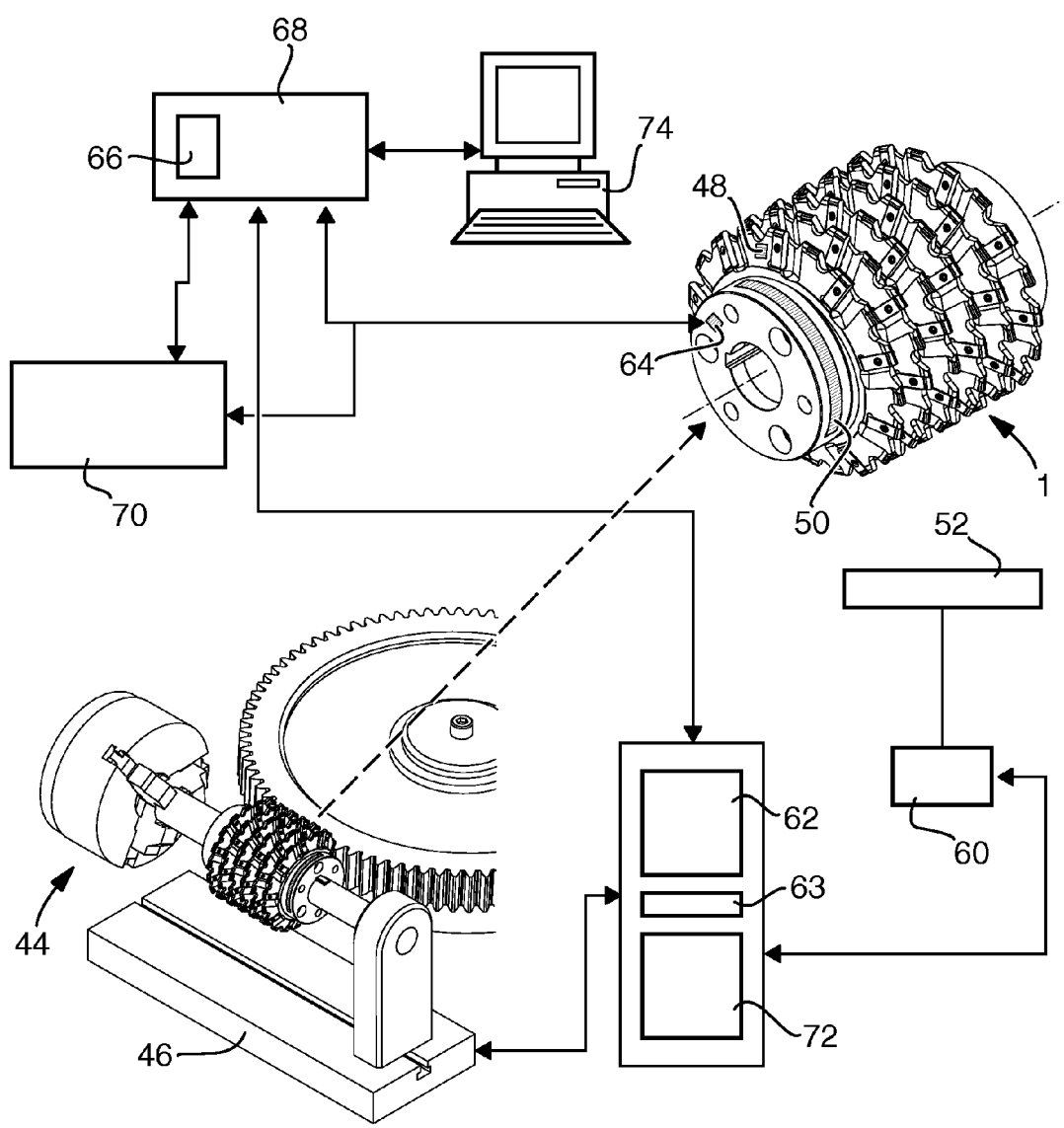
FIG. 11 is a schematic diagram illustrating further aspects of an embodiment of the arrangement according to the present invention.

With reference to FIG. 11, further aspects of an embodiment of the arrangement according to the present invention are schematically illustrated. The processing unit 60 may be a Central Processing Unit, CPU, or a processor. The processing unit 60 may be connected to the at least one second antenna 52, e.g., via conventional communication paths, such as via a cable. As stated above, the processing unit 60 is arranged to transmit the interrogation signal and transmission energy to the at least one first antenna 50 and to the at least one SAW sensor 48 via the at least one second antenna 52. The processing unit 60 is arranged to receive the detected at least one parameter via the at least one second antenna 52. The monitoring system may comprise a process monitoring unit 72. The process monitoring unit 72 may be a stand-alone unit arranged to communicate with the processing unit 60, e.g. via conventional communication paths, such as via a cable or wirelessly. The process monitoring unit 72 may be included in the processing unit 60 with algorithms for cutting tool and process monitoring. As shown in FIG. 11, the process monitoring unit 72 may comprise a software module, with algorithms for cutting tool and process monitoring, integrated with the control system 62, e.g. with the CNC. Thus, the control system 62 may be arranged to communicate with the process monitoring unit 72. The process monitoring unit 72 may be connected to the CNC via the above-mentioned process control/action unit 63. Alternatively, the process monitoring unit 72 may be a remote function, e.g. via an Internet-based cloud service or any other service. The control system 62 may be arranged to control motions, such as motion along and about, respectively, the above-mentioned axes C1, C2, f, spindles, tool change mechanisms etc., of the machine 44 during machining of a work piece W (see FIG. 1). The control system 62 may be arranged to communicate with the monitoring system via conventional communication paths, such as via a cable or wirelessly, as disclosed above.

With reference to FIG. 12, the arrangement may comprise a machine 44 arranged to machine the work piece by means of the cutting tool 1. The machine 44 may comprise a stand 46 arranged to hold the holder or the rotatable spindle to which the cutting tool 1 is connected. The stand 44 may be arranged to hold the work piece W. The control system 62 may be arranged to control said machine 44. The control system 62 may be arranged to control the axes (linear and rotary), coolant supply etc. of said machine 44. The at least one second antenna 52 may be mounted to said stand 46. Advantageously, the at least one second antenna 52 may be mounted to said stand 46 such that no electrically conductive material or object, e.g. metal material, is blocking the wireless path between the at least one first antenna 50; 150; 250 and the at least one second antenna 52, whereby a good wireless communication between the antennas 50, 52 can be assured. The second antenna 52 may be mounted to an inner wall of the space in which the cutting tool 1 is operating. The at least one second antenna 52 may be made of one or a plurality of flexible materials and may thus be flexible in order to get an optimal fit into the machine 44. The at least one first antenna 50 may be made of one or a plurality of flexible materials and may thus be flexible in order to get an optimal fit to the cutting tool. The at least one second antenna 52 may comprise at least one microstrip antenna. Each second antenna 52 may comprise at least one patch antenna. However, each second antenna 52 may comprise any other type of antenna. Each second antenna 52 may have two integrated antennas in order to increase the number of available transmission channels. One second antenna 52 for each first antenna 50 may be provided. Thus, if there are two first antennas 50, two second antennas 52 may be provided, e.g. in the proximity of the respective first antenna 50.

With reference to FIG. 11, The above-mentioned identification means 64; 164; 264 (see also FIGS. 8 and 9), or identification unit, which is arranged to be attached to the cutting tool 1; 101; 201, may e.g. be a RFID unit, a QR code, and/or a memory chip, providing at least identity data of the cutting tool 1. Alternatively, the SAW sensor 48 may form the identification means 64. The monitoring system may be arranged to communicate with the identification system, e.g. via conventional communication paths, such as via a cable or wirelessly. The identification system may be arranged to communicate with the at least one storage memory 66, e.g., via conventional communication paths, such as via a cable or wirelessly. At stated above, the storage memory 66 may comprise at least one database and may be included in the cutting tool data module 68. Alternatively, the identification means 64 may comprise the storage memory 66. The cutting tool data module 68 may be connected to the cutting tool pre-setting unit 70, e.g., via conventional communication paths, such as via a cable or wirelessly. A user terminal 74, e.g. a computer, PC, smart phone or any other device, may be connected to and arranged to communicate with the cutting tool data module 68.

The features of the different embodiments of the arrangement and the cutting tool, respectively, disclosed above may be combined in various possible ways providing further advantageous embodiments.

The invention shall not be considered limited to the embodiments illustrated, but can be modified and altered in many ways by one skilled in the art, without departing from the scope of the appended claims.

The invention claimed is:

1. An arrangement for controlling the process of rotary chip removing machining of a work piece comprising:
   a monitoring system for monitoring the rotary chip removing machining, the monitoring system including at least one surface acoustic wave sensor arranged to be mounted to a cutting tool for rotary chip removing machining of the work piece, the at least one acoustic wave sensor being positioned in close proximity to a region of the cutting tool where at least one parameter of a group of parameters consisting of strain, temperature and pressure is most efficiently detected;
   at least one first antenna arranged to be mounted to the cutting tool, the at least one first antenna being connectable to the at least one surface acoustic wave sensor;
   at least one second antenna, the at least one first antenna being arranged for wireless communication with the at least one second antenna, wherein each surface acoustic wave sensor is arranged to detect at least one parameter of a group of parameters consisting of strain, temperature and pressure, wherein the at least one surface acoustic wave sensor and the at least one first antenna are arranged to transmit the detected at least one parameter to the second antenna in response to an interrogation signal received by the first antenna from the second antenna, wherein the at least one surface acoustic wave sensor and the at least one first antenna are arranged to receive energy from the interrogation signal in order to transmit the detected at least one parameter to the second antenna;
   a processing unit connected to the at least one second antenna, wherein the processing unit is arranged to transmit the interrogation signal and transmission energy to the at least one first antenna and to the at least one surface acoustic wave sensor via the at least one second antenna, wherein the processing unit is arranged to receive the detected at least one parameter via the at least one second antenna; and
   a control system arranged to communicate with the monitoring system, and wherein the control system is arranged to control the rotary chip removing machining of the work piece at least partially based on the detected at least one parameter.

2. An arrangement according to claim 1, further comprising an identification system for identifying cutting tools including identification means arranged to be attached to the cutting tool, the identification means being arranged to provide at least identity data of the cutting tool, and wherein the monitoring system is arranged to communicate with the identification system.

3. An arrangement according to claim 2, further comprising at least one storage memory for storing data of the at least one cutting tool, the identification system being arranged to communicate with the at least one storage memory.

4. An arrangement according to claim 1, further comprising a machine arranged to machine the work piece by means of the cutting tool, the machine including a stand arranged to hold a holder or a rotatable spindle to which the cutting tool is connectable, and wherein the control system is arranged to control said machine at least partially based on the detected at least one parameter.

5. An arrangement according to claim 4, wherein the at least one second antenna is mounted to said stand.

6. An arrangement according to claim 5, wherein the at least one second antenna is mounted to said stand such that no conductive material is blocking a wireless path between the at least one first antenna and the at least one second antenna.

7. An arrangement according to claim 1, wherein the at least one first and/or second antenna are made of one or a plurality of flexible materials.

8. A cutting tool for use in an arrangement for controlling the process of rotary chip removing machining of a work piece, the cutting tool comprising:
   a tool body which is connectable to a holder or a rotatable spindle, the tool body defining a center axis and having at least one cutting edge or at least one seat-for receiving a cutting insert having at least one cutting edge; and
   at least one surface acoustic wave sensor and at least one first antenna connectable to the at least one surface acoustic wave sensor, the at least one first antenna being arranged for wireless communication with at least one second antenna, wherein each surface acoustic wave sensor is arranged to detect at least one parameter of a group of parameters consisting of strain, temperature and pressure, the at least one acoustic wave sensor being positioned in close proximity to a region of the cutting tool where the at least one parameter is most efficiently detected, wherein the at least one surface acoustic wave sensor and the at least one first antenna are arranged to transmit the detected at least one parameter to the second antenna in response to an interrogation signal received by the first antenna from the second antenna, and wherein the at least one surface acoustic wave sensor and the at least one first antenna are arranged to receive energy from the interrogation signal in order to transmit the detected at least one parameter to the second antenna.

9. A cutting tool according to claim 8, wherein the tool body has the at least one surface acoustic wave sensor and the at least one surface acoustic wave sensor is located adjacent to at least one cutting edge or at least one seat.

10. A cutting tool according to claim 8, further comprising at least one tool member connectable to the holder or rotatable spindle, wherein the tool body is connectable to the holder or rotatable spindle via the least one tool member, the at least one tool member having at least one electrical connector, wherein the tool body is provided with at least one electrical connector connected to the at least one surface acoustic wave sensor, and wherein each electrical connector is directly connectable to the first antenna or indirectly connectable to the first antenna via at least one intermediate electrical connector.

11. A cutting tool according to claim 8, wherein the cutting tool is arranged for the hobbing of a work piece, the center axis of the tool body being a rotation axis, the tool body including a plurality of segments, each segment comprising a plurality of circumferentially spaced apart cutting edges or seats, each seat being arranged to receive a cutting insert, and in that each segment is provided with at least one surface acoustic wave sensor.

12. A cutting tool according to claim 11, wherein adjoining segments are detachably connectable to one another, each segment being provided with at least one electrical connector connected to the at least one surface acoustic wave sensor of the same segment, and in that each electrical connector is connectable to the first antenna or indirectly connectable to the first antenna via one or more intermediate electrical connectors of one or a plurality of intermediate segments.

13. A cutting tool according to claim 12, wherein each segment defines a center axis and includes a first side and a second side, the center axis of the segment extending through the first and second sides and being collinear with the center axis of the tool body, the first side of each electrical connector of the segment being detachably connectable to the first antenna and/or to an electrical connector of an adjoining segment, wherein the second side of each electrical connector of the segment is detachably connectable to the first antenna and/or to an electrical connector of an adjoining segment.

14. A cutting tool according to claim 11, wherein each segment includes a peripheral cam having the plurality of circumferentially spaced apart cutting edges or seats, wherein the peripheral cam extends along a helical line, in relation to a direction of rotation about the rotation axis one of the cutting edges or seats of the peripheral cam is a leading cutting edge or leading seat in relation to the other cutting edges or seats of the segment, and in that at least the leading cutting edge or leading seat is provided with at least one adjacent surface acoustic wave sensor.

15. A cutting tool according to claim 11, further comprising two end members through which the center axis of the cutting tool extends, wherein the plurality of segments are located between said two end members, and in that at least one of the two end members is provided with the at least one first antenna.

16. An arrangement according to claim 1, further comprising at least one cutting tool having a tool body connectable to a holder or a rotatable spindle, the tool body defining a center axis and having at least one cutting edge or at least one seat for receiving a cutting insert having at least one cutting edge, at least one surface acoustic wave sensor and at least one first antenna connectable to the at least one surface acoustic wave sensor, the at least one first antenna being arranged for wireless communication with at least one second antenna, wherein each surface acoustic wave sensor is arranged to detect the at least one parameter of the group of parameters consisting of strain, temperature and pressure, wherein the at least one surface acoustic wave sensor and the at least one first antenna are arranged to transmit the detected at least one parameter to the second antenna in response to an interrogation signal received by the first antenna from the second antenna, and wherein the at least one surface acoustic wave sensor and the at least one first antenna are arranged to receive energy from the interrogation signal in order to transmit the detected at least one parameter to the second antenna.

* * * * *